May 25, 1954

B. C. BELLOWS, JR 2,679,632

DIRECTIONAL COUPLER

Filed June 28, 1950

INVENTOR
B. C. BELLOWS JR.
BY
*H. A. Burgess*
ATTORNEY

May 25, 1954

B. C. BELLOWS, JR 2,679,632

DIRECTIONAL COUPLER

Filed June 28, 1950

INVENTOR
B.C. BELLOWS JR.
BY
*H. A. Burger*
ATTORNEY

Patented May 25, 1954

2,679,632

UNITED STATES PATENT OFFICE 2,679,632

DIRECTIONAL COUPLER

Brian C. Bellows, Jr., Brookside, N. J., assignor to Bell Telephone Laboratories, Incorporated, New York, N. Y., a corporation of New York Application June 28, 1950, Serial No. 170,920

4 Claims. (Cl. 333—10)

This invention relates to apparatus for coupling energy flowing in a first transmission line into a second transmission line which is responsive to the direction of flow of the energy in the first transmission line. Devices of this type have come to be known as directional couplers and are useful, for example, in determining the ratio of the reflected energy to the direct transmitted energy in transmission lines.

Directional couplers comprise means for coupling a relatively small amount of the energy in one transmission line, usually designated the primary line, into another transmission line, designated the secondary line. Either or both of these lines may comprise, for example, conventional two-wire lines, coaxial cables, or wave guides. A portion of the energy in the primary line is coupled into the secondary line in such a manner that if the secondary line is properly terminated at both ends, the coupled direct energy will appear only at one of the terminations of the secondary line, and the coupled reflected energy will appear only at the other termination. If these terminations include energy measuring devices, the ratio of the reflected to the direct transmission or standing wave ratio may readily be observed. Other uses for directional couplers are discussed in an article by W. W. Mumford, entitled "Directional couplers," which appears in the Proceedings of the Institute of Radio Engineers, vol. 35, pages 160 to 165, February 1947.

If the coupling between the primary and the secondary lines is of one type only, that is, either inductive or capacitive, more than one coupling link is required to give the device directional qualities. The several coupling means are properly spaced so that in the secondary line, the coupled components will add in one direction and subtract in the other. For example, if two coupling links are employed, the coupled components will have the proper phase relations in the secondary line if the links are spaced a quarter of a wavelength apart. It is, of course, also necessary that the secondary line, which is usually a short section, be properly terminated so that energy coupled into one termination of the secondary line will not reflect into the other termination.

It is an object of this invention to provide a compact wide-band directional coupler and, more specifically, one which requires no critical spacing of coupling elements along the direction of transmission.

It is also an object of the invention to provide a directional coupler which is both compact and easy of adjustment.

A more specific object of the invention is to provide a directional coupler for use at frequencies on the order of 100 megacycles and in transmission lines which employ coaxial cables.

A directional coupler in accordance with an illustrative embodiment of the invention, which will be described in detail hereinafter, comprises two coaxial circuits having their inner conductors passing through a common outer conductor so that there is both inductive and capacitive coupling between the two circuits. The inductively coupled and capacitively coupled components of the direct wave will add at one of the secondary coaxial terminals and subtract at the other. The coupled reflected components similarly add and subtract but at opposite terminals. Screws bearing on the inner conductors are provided to vary the spacing between the inner conductors and hence the tightness of the capacitive coupling and to a lesser extent the inductive coupling between the circuits so that the coupled components may be balanced out at their proper respective terminals. Since no critical spacings or resonances are employed, the directional properties of the coupler are broadly independent of frequency.

The invention may be better understood from a consideration of the following detailed description when read in accordance with the attached drawings, in which.

Figure 1:
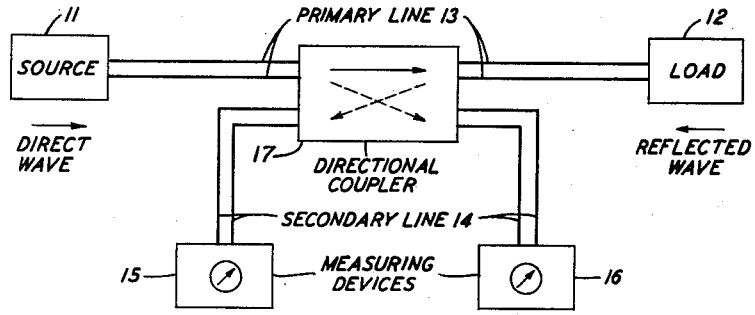
Fig. 1 illustrates by block diagram the general properties of a typical directional coupler.

A directional coupler will first be discussed briefly in general terms with particular reference to Fig. 1. A source 11 is connected to supply energy to a load 12 over a primary transmission line 13. A portion of the energy flowing in the primary line 12 is coupled into a secondary transmission line 14, terminated at either of its terminals by energy measuring devices 15 and 16, by means of the directional coupler 17, through which both transmission lines pass. In addition to the direct wave traveling from the source 11 to the load 12, there will be a reflected wave traveling in the opposite direction if the load 12 does not terminate the primary transmission line in its characteristic impedance. The directions of coupling between the primary line 13 and the secondary line 14 are indicated by the dotted arrows in the directional coupler 17; the solid arrow indicates the direction of propagation of the direct wave. For example, a portion of the direct wave originating in source 11 will be coupled into the secondary line 14 and appear at the measuring device 16 although not at the devices 15. Similarly, energy reflected from the load 12 will be coupled into the secondary line 14 and will appear at the measuring device 15 although not at the device 16. If the measuring devices 15 and 16 are similar, the ratio of the reading of device 15 to that of device 16 will give an indication of the standing wave ratio or reflection coefficient in the primary line 13. Ordinarily, the directional coupler 17 will be designed to couple only a small portion of the energy in the primary line into the secondary line so that the direct wave passing from source 11 to the load 12 will be substantially unattenuated by the directional coupler 17.

Figure 2:
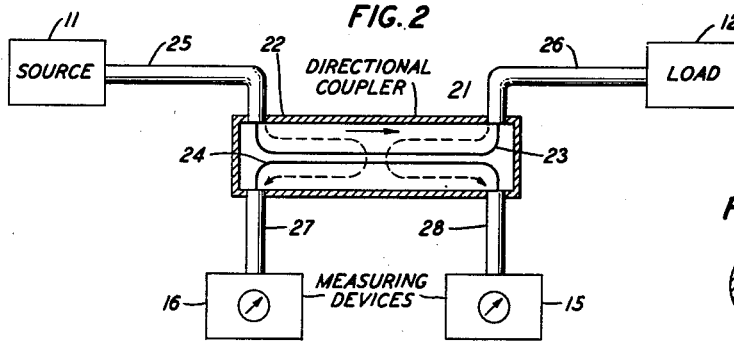
Figs. 2 and 2b show diagrammatically a directional coupler embodying principles of the present invention and Fig. 2A shows the equivalent circuit of the directional coupler illustrated in Fig. 2.
Figure 2B:
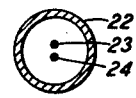

A directional coupler in accordance with the present invention is illustrated diagrammatically in Fig. 2. The coupler 21 has an outer conductor 22 having a circular cross section and a pair of inner conductors 23 and 24. The inner conductor 23 is connected at either end to coaxial sections 25 and 26 which comprise the primary transmission line connecting the source 11 to the load 12. The inner conductor 24 is connected at either end to coaxial sections 27 and 28 which comprise the secondary line and which are terminated by measuring devices 15 and 16. The directions of coupling indicated in connection with the description of Fig. 1 are shown in accordance with the directional couplers described in the aforementioned article by W. W. Mumford. It will be noted, however, that the directions of coupling in the coupler shown in Fig. 2 are not as shown in Fig. 1 but are as indicated by the dotted arrows in the coupler 21 of Fig. 2, for reasons which will be described below.

Figure 2A:
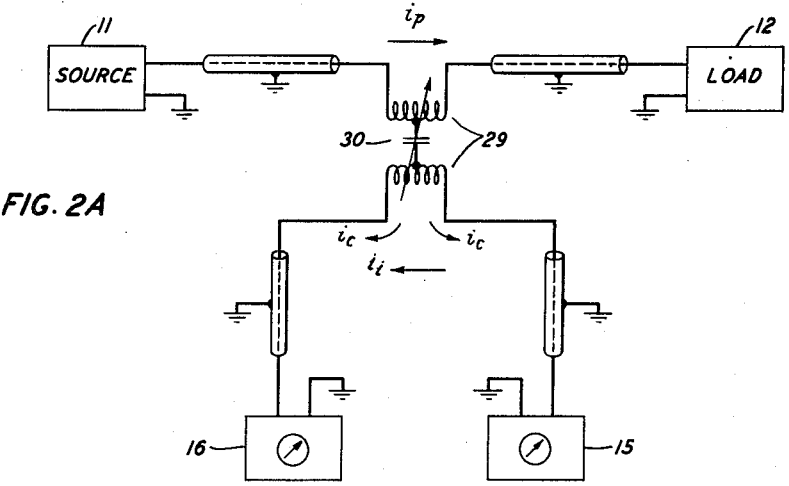

The operation of the directional coupler 21 of Fig. 2 may be understood by referring to the equivalent circuit thereof shown in Fig. 2A. The transformer 29 represents the inductive coupling due to the distributed mutual inductance between the inner conductors 23 and 24 and condenser 30 represents the capacitive coupling between the inner conductors. If the energy from source 11 causes a current $i_p$ to flow in the primary line, a current $i_i$ flowing in the opposite direction will be induced in the secondary line due to the inductive coupling of the inner conductors and out of phase voltages will be developed across devices 15 and 16. Also, due to the voltage impressed on the primary line, currents $i_c$ will flow in the secondary line as a result of the voltage appearing therein by virtue of the capacitive coupling. The current $i_i$ flowing to the measuring device 16 will have the same phase as the current $i_c$, whereas the coupled currents $i_i$ and $i_c$ flowing to the device 15 will be of the opposite phase. Therefore, if the coupled components are equal, a voltage will be applied to the device 16 but the voltages applied to device 15 will be balanced out. In a similar manner, it will be obvious that reflected energy flowing in the opposite direction to $i_p$ will result in a voltage applied to device 15 but none to device 16 if the inductive and capacitive couplings are equal. It is of course necessary that the devices 15 and 16 perfectly terminate their respective coaxial sections so that energy applied to one device will not result in reflected energy which would flow to the other device. The inductive and capacitive couplings may be varied by varying the space between the inner conductors by means not shown in Fig. 2 but which will be described in connection with Fig. 3.

The voltage due to both types of coupling increases in proportion to the frequency of the applied signal. This results in an increase with increasing frequency of the power which appears at the measuring device where the voltage is added. Since the voltages due to both types of coupling vary in the same way with changing frequency, however, the effectiveness of the cancellation which occurs at the other outlet is independent of frequency giving the device a broad band characteristic.

Figure 3:
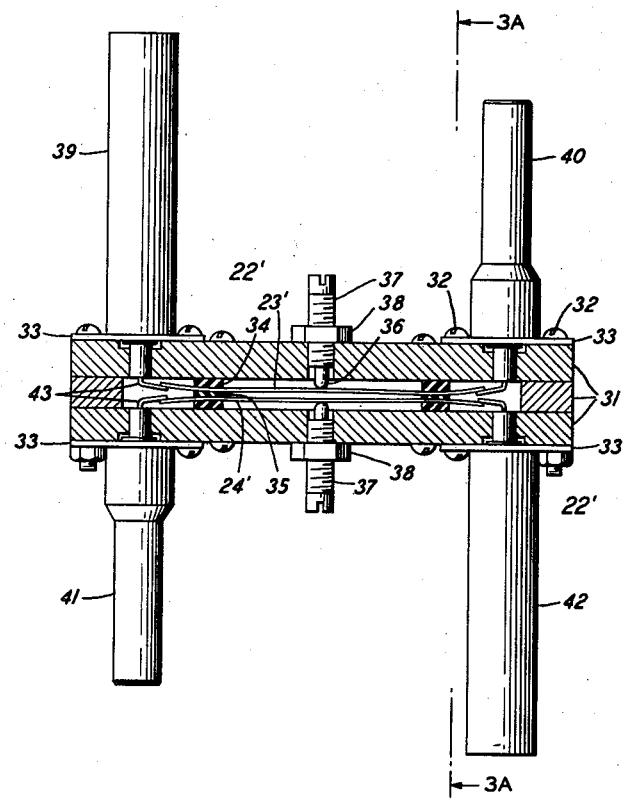
Figs. 3 and 3A show in detail a directional coupler constructed in accordance with principles of the present invention; and, Fig. 4 illustrates diagrammatically a directional coupler, embodying principles of the invention, for use with balanced lines.
Figure 3A:
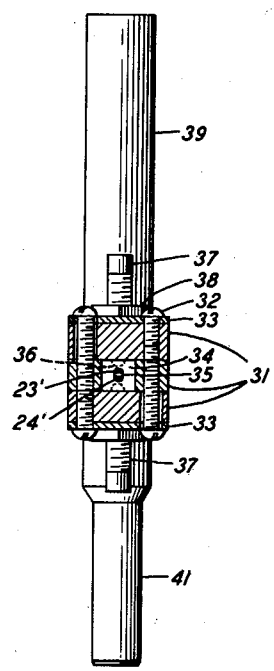
Figure 3A:
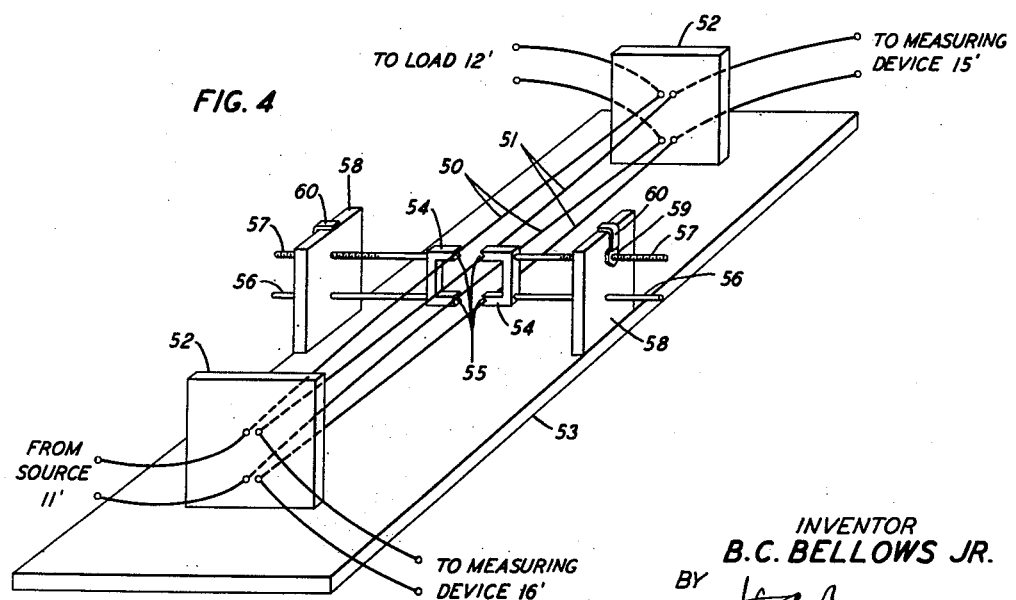

A specific embodiment of a directional coupler constructed in accordance with the present invention is shown by way of illustration in detail in Figs. 3 and 3A. The outer shield or conductor 22' of the coupler comprises a plurality of blocks of conductive material 31 which are held together by means of screws 32 and plates 33 as shown in the figures. The center conductors 23' and 24' are made of a material which is preferably springy such as coin silver and are supported longitudinally within the hollow outer conductor by means of the supporting members 34. The supporting members are made of a material which has a low dielectric constant, for example, polytetrafluoroethylene and have a centrally located hole adapted to receive and tightly hold the conductors 23' and 24' in place. The adjacent surfaces of the two conductors are flat to enhance the capacitance between the wires and the wires are separated at the supporting members by the spacers 35. The conductors 23' and 24' are bowed outward slightly between the supporting members so that they bear against the tips 36 of the screws 37 which project through opposite walls of the outer conductor 22'. The tips 36 are also preferably of low dielectric material. It is possible by varying either or both of the screws 37 to vary the spacing between the wires and hence the capacitive coupling between the two conductors. The inductive coupling will also be varied but by a much smaller amount so that the tuning is primarily capacitive. Lock nuts 38 are provided to prevent unintentional movement of the screws 37.

Coaxial connections comprising terminal jacks 40 and 41 and plugs 39 and 42 are provided for connecting to external circuits. Each coaxial connector has its inner conductor 43 soldered to one end of one of the conductors 23' or 24'.

It should be noted that the coupler has no critical lengths dependent on frequency. In fact, the length of the inner conductors between the supporting blocks 34 may be only a fraction of a wavelength long at the operating frequency. In one embodiment constructed for use at about 75 megacycles, the entire unit was on the order of four inches long, showing that the device may be constructed with compact proportions. In the embodiment constructed, there was substantially no attenuation between the coaxial plug 39 and the coaxial jack 40, whereas there was on the order of 23-decibel loss between the plug 39 and the jack 41.

It may be seen that the coupler shown in Fig. 3 is symmetrical so that either side of the coupler may be inserted in series with the primary or secondary line and the direct transmission may be in either direction through the device. Also, if the 23-decibel loss between coaxial connections 39 and 41, or, between connections 40 and 42 is tolerable or even desirable, the primary line may be connected to terminals 39 and 41, or, 40 and 42 with the secondary line being connected to the opposite two terminals. For example, if the source is connected to terminal 39 and the load to terminal 41, a measure of the direct energy may be obtained by connecting a measuring device to terminal 40 and a measure of the reflected energy may be obtained from a similar device connected to terminal 42.

Referring again to Fig. 2, the necessary balance between the two types of coupling may be achieved by replacing both the load 12 and the device 16 with an impedance equal to the characteristic impedance of their associated lines and then by adjusting the spacing of conductors 23 and 24 for a minimum reading of the device 15. If it is desirable to use only one measuring device, the device 16 may be omitted; and, when it is desired to obtain an indication of the direct wave, it is necessary merely to either open or short-circuit section 27 of the secondary line so that the direct energy coupled into this section will be reflected into the device 15. Section 27 may again be terminated by its characteristic impedance when it is desired to obtain an indication of the reflected wave.

Principles of the present invention are also applicable to balanced two wire lines as is illustrated in Fig. 4. Two bowed pairs of conductors 50 and 51 are supported by a pair of blocks 52 mounted on a base 53, so that there is capacitive and inductive coupling between the pairs. The pairs 50 and 51 are connected, respectively, in series with a primary line which connects a source 11' to a load 12', and a secondary line which is terminated by measuring devices 15' and 16'. A pair of forked members 54 equipped with slotted tips 55 engage each pair of conductors by means of the slots. The members 54 are made of insulating material and are each mounted for longitudinal motion by means of a guide rod 56 and a threaded rod 57 which pass through the blocks 58 rigidly mounted on base 52. Nuts 59 are provided to impart motion to the forked members; axial motion of the nuts 59 is prevented by the retaining member 60. Coupling between the primary and secondary lines will exist as described in connection with the unbalanced line coupler illustrated in Figs. 2 and 2A due to the capacitive and inductive coupling between the adjacent lines. The spacing between the conductors, and hence the balance of the coupler, is controlled by varying either or both of the nuts 59 which varies the coupling between the lines.

Although the invention has been described with reference to specific embodiments, numerous other modifications and embodiments will readily occur to one skilled in the art without departing from the spirit or scope of the invention.

What is claimed is:

1. A directional coupler which comprises a longitudinally hollow outer conducting member, a pair of conductors made of springy material longitudinally disposed within said hollow member, transmission means connected to each end of each of said pair of conductors, a pair of spaced members supporting said pair of conductors within said hollow member in a manner such that they bow outward slightly from each other between said supporting members and a pair of longitudinally movable members projecting through opposite sides of said hollow member and each having its end within said guide bearing on the bowed portion of one of said conductors.

2. A directional coupler comprising a longitudinally hollow outer conducting member, a pair of conductors each having a semicircular cross section longitudinally disposed within said hollow member, two spaced supporting members for said conductors located within said hollow member and holding said conductors so that the flat edges thereof face each other, a pair of screw members projecting through opposite sides of said hollow member at points between said supporting members and having their inner ends, respectively, bearing on one of said conductors to control the relative spacing of said conductors, and coaxial transmission means coupled to each end of each of said inner conductors.

3. The combination in accordance with claim 2, wherein said hollow outer conducting member has a rectangular cross section.

4. The combination in accordance with claim 2, wherein said hollow conducting member has a circular cross section and wherein said screw members are diammetrically opposed.

References Cited in the file of this patent

UNITED STATES PATENTS

| Number | Name | Date |
|---|---|---|
| 2,412,393 | Ghosh | Dec. 10, 1946 |
| 2,423,416 | Sontheimer et al. | July 1, 1947 |
| 2,474,688 | Pease | June 28, 1949 |
| 2,486,818 | Bowman | Nov. 1, 1949 |
| 2,494,596 | Vahle | Jan. 17, 1950 |
| 2,523,254 | Talpey | Sept. 19, 1950 |
| 2,531,777 | Marshall | Nov. 28, 1950 |
| 2,554,295 | Cooper | May 22, 1951 |
| 2,575,571 | Wheeler | Nov. 20, 1951 |

FOREIGN PATENTS

| Number | Country | Date |
|---|---|---|
| 583,501 | Great Britain | Dec. 19, 1946 |